United States Patent [19]
Nakamura

[11] 3,905,658
[45] Sept. 16, 1975

[54] ROTATORY SHAFT FLUID BEARING

[76] Inventor: Giichi Nakamura, 2,4-chome, Gamocho, Jotoku, Osaka, Japan

[22] Filed: Jan. 9, 1974

[21] Appl. No.: 431,988

[52] U.S. Cl. .................................. 308/36.1; 308/9
[51] Int. Cl.² .. F16C 1/24; F16C 7/04; F16C 33/74; F16J 15/34
[58] Field of Search .............................. 308/9, 36.1

[56] References Cited
UNITED STATES PATENTS

| | | | |
|---|---|---|---|
| 3,006,699 | 10/1961 | Erlbacher | 308/36.1 |
| 3,512,850 | 5/1970 | Youden | 308/9 |
| 3,661,432 | 5/1972 | Aihara | 308/9 |
| 3,767,277 | 10/1973 | Woolcock | 308/9 |

Primary Examiner—M. Henson Wood, Jr.
Assistant Examiner—Howard Beltran
Attorney, Agent, or Firm—George B. Oujevolk

[57] ABSTRACT

A shaft bearing provided with a fluid-tight sealed horizontal bushing and a continuous fluid passage from bottom to top of the bushing so that the shaft to be supported may float in a fluid hydrodynamically within the bushing as the fluid flows upward continuously all round the shaft through the bushing with a given head.

4 Claims, 3 Drawing Figures

FIG.1

PATENTED SEP 16 1975

3,905,658

ROTATORY SHAFT FLUID BEARING

The present invention relates to a fluid bearing, and more particularly to a bearing to support a rotating shaft hydrodynamically with a fluid flowing through a sealed bushing of the bearing.

In conventional bearings of the type horizontally supporting a rotating shaft in contact with a bearing bushing there inevitably occurs a substantial friction of the shaft against the bush. The friction will cause a substantial abrasion both to the bush and to the shaft; the abrasion will be the greatest in the lower half of the bush on which the total weight of the shaft plus all the attachments is loaded. Moreover, the friction will cause a considerable loss of the drive required for rotating the shaft. Various kinds of lubricants are conventionally applied between the bush and the shaft to reduce the friction. However, no lubricants can eliminate the friction entirely.

A primary object of the invention is to provide a bearing in which the friction of the shaft against the bushing is completely eliminated.

Another object of the invention is to provide a bearing in which both the bushing and shaft are permanently free from mutual abrasion and the frictional loss of the drive required for rotating the shaft is considerably reduced.

A more specific object of the invention is to provide a bearing which supports a shaft with a fluid in a hydrodynamically floating relation within a fluid-tight sealed bushing as the fluid flows upward continuously all round the shaft through the bushing with a given head.

Other objects and advantages of the invention will be readily appreciated as the same become better understood hereinafter when considered in connection with the accompanying drawings in which.

Figure 1:
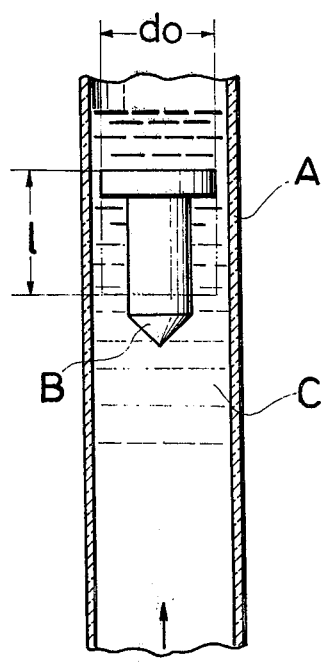
FIG. 1 shows, in vertical elevation, a metallic piece floating in a fluid flowing through a cylinder, illustrating the principle on which the invention is based.

Referring to FIG. 1, there is a metallic piece B in a vertical cylinder A both ends of which are opened. A fluid C flows upward continuously through the vertical cylinder A with a given head as indicated with the arrow mark. The metallic piece B is made of iron or other similar material with a substantial specific gravity, and has a configuration which to is a combination of a cylindrical and conical shape. The largest diameter of metallic piece B is substantially smaller than the diameter of cylinder A. The metallic piece B may be regarded as having the same volume as an imaginary cylinder with a diameter of $d_o$ and a height of $l$ as shown in dotted lines. The fluid C is water or other similar liquid with a specific gravity much smaller than the metallic piece B.

As the fluid C flows upward continuously through the vertical cylinder A with a given head, the metallic piece B floats hydrodynamically at a given level in the fluid C. In this state, the gravity of metallic piece B relative to fluid C is counterbalanced with the hydrodynamic buoyancy of metallic piece B caused by the fluid C, in another expression:

$$\frac{\pi}{4} d_o^2 \times h \times \gamma = (\rho - \gamma) \times l \times \frac{\pi}{4} d_o^2 \qquad (1)$$

where:

$h$ = Head of fluid
$\rho$ = Specific gravity of metallic piece
$\gamma$ = Specific gravity of fluid Because $\gamma$ is much smaller than $\rho$, the second term in the right side of equation (1) has a value much smaller than the first term in the same side and thus may be disregarded practically. Then the equation (1) will be expressed as follows:

$$\frac{\pi}{4} d_o^2 \times h \times \gamma = \frac{\pi}{4} d_o^2 \times l \times \rho \qquad (2)$$

From (2):

$$h = \frac{l \times \rho}{\gamma} \qquad (3)$$

It means that the metallic piece B does not sink but floats hydrodynamically at a given level in the fluid C as the fluid C flows upward continuously through the cylinder A with a head of $l \cdot \rho/\gamma$.

Suppose, for instance, $l = 2$ cm, $\rho = 8$ and $\gamma = 1$, then $h$ will be given 6.3 inches (16 cm) in terms of length from the above relation (3). It indicates that a metallic piece with a substantial specific gravity can float in a fluid flowing upward continuously even with a relatively low head.

If, however, the upper end of cylinder A is closed, the fluid C will not be able to continue to flow any more. And then the metallic piece B will no more float in the fluid C but immediately sink down to the lower end of cylinder A by the gravity of metallic piece B relative to fluid C, because there is no hydrodynamic buoyancy caused by the fluid C and the hydrostatic pressure is counterbalanced by itself on all the sides of metallic piece B, however high the head of fluid may be.

It follows that a metallic or other similar matter with a substantial specific gravity can be supported with a fluid in a hydrodynamically floating relation at a given level so long as the fluid flows upward continuously with a given head, which may be relatively low. This is the principle on which based is the present invention.

Figure 2:
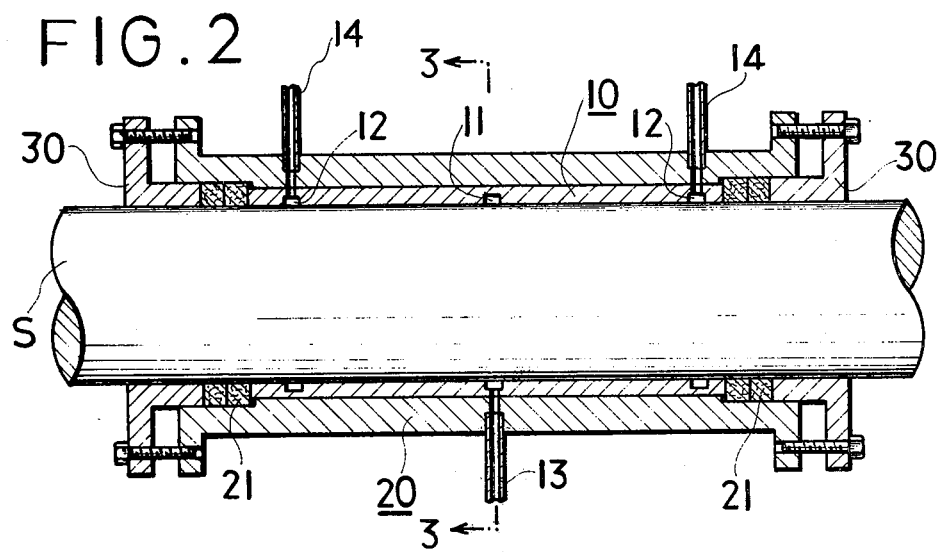
FIG. 2 is a vertical elevation of a fluid bearing embodying the invention.
Figure 3:
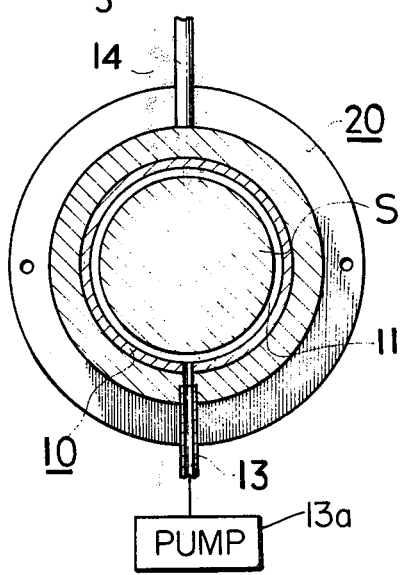
FIG. 3 is a cross section taken approximately on line 3—3 in FIG. 2.

Referring to FIGS. 2 and 3, the bearing embodying the invention primarily comprises a horizontal cylindrical housing 20, a cylindrical bushing 10 provided inside the housing 20 to support a rotating shaft S in an inserted relation, packing means provided at both sides of bushing 10 to seal the bushing 10 and the shaft S in a fluid-tight relation, conduit means to supply a fluid into the lowermost central portion of bushing 10, conduit means to discharge a fluid out of both uppermost side portions of bushing 10, and a pump 13a to drive a fluid from outside into the bushing 10 by way of the supply conduit means with a given head.

The fluid is oil or other similar liquid with a specific gravity much smaller than the Shaft S.

The bushing 10 is made of metallic material and lined with gun metal or Babbitt metal inside. The inner diameter or bush 10 is so much larger than the diameter of shaft S that there is a substantial clearance between the bush 10 and the shaft S to provide a continuous fluid passage all round the shaft S within the bush 10.

The bushing 10 is provided with an annular groove 11 in the central portion of its inner wall and also with a pair of annular grooves 12 and 12 in both side portions of its inner wall. There is a distance of n between both side annular grooves 12 and 12.

The shaft S is made of steel or other similar metallic material with a substantial specific gravity.

The packing means include a pair of glands 30 and packing members 21. The packing means are most preferably those separately invented by the inventor for frictionless and fluid-tight shaft sealing.

The supply conduit means consist of a supply pipe 13, a radial aperture in the lowermost central portion of housing 20 and a radial aperture in the lowermost central portion of bushing 10. The central annular groove 11 is connected to the supply pipe 13 by way of these central radial apertures of bushing 10 and housing 20 in an aligned relation.

The discharge conduit means consist of a pair of discharge pipes 14 and 14, a pair of radial apertures in both uppermost side portions of housing 20 and a pair of radial apertures in both uppermost side portions of bushing 10. The side annular grooves 12 and 12 bushing 10 are connected to the discharge pipes 14 and 14 by way of these side radial apertures of bush 10 and housing 20 in aligned relations, respectively.

For convenience' sake the shaft S plus all the attachments may be regarded to have the same weight as the shaft S with an imaginary length of m which is much larger than the distance of n between both side annular grooves 12 and 12 of bushing 10.

The fluid is continuously supplied into the bushing 10 by way of the pipe 13 and discharged out of the bushing 10 by way of the pipes 14 and 14 with a given head by the drive of pump 13a. In this case, the fluid initially enters the lowermost of the central annular groove 11 from the supply pipe 13 through the central radial apertures of housing 20 and bushing 10, then it flows upward through the continuous fluid passage all round the shaft S within the bushing 10, and finally leaves the uppermost of both side annular grooves 12 & 12 into the discharge pipes 14 and 14 through the side radial apertures of bushing 10 and housing 20 respectively. In other words, the fluid flows upward continuously all round the shaft S through the bush 10 with a given head.

The fluid discharged from the pipes 14 and 14 may be recirculated into the bushing 10 through the supply pipe 13 by the drive of pump.

As the fluid flows upward continuously through the bushing 10 with a given head, the shaft S floats hydrodynamically at a given level in the fluid. In this case, that portion of shaft S which has a length of $n$ and lies between both side annular grooves 12 and 12 of bushing 10 is immersed in the fluid, and therefore the hydrodynamic buoyancy $B_s$ of shaft S caused by the fluid will be given as follows:

$$B_s = d \times n \times h \times \gamma \qquad (4)$$

where;
 $d$ = Diameter of shaft
 $h$ = Head of fluid
 $\gamma$ = Specific gravity of fluid Since the shaft S plus all the attachments may be regarded to have the same weight as the shaft S with an imaginary length of m, the gravity $G_s$ of shaft S plus all the attachments relative to fluid will be expressed as follows:

$$G_s = \frac{\pi}{4} d^2 \times (m \times \rho - n \times \gamma) \qquad (5)$$

where;
 $d$ = Diameter of shaft
 $\rho$ = Specific gravity of shaft
 $\gamma$ = Specific gravity of fluid Because $n$ and $\gamma$ are much smaller than $m$ and $\rho$ respectively, the second term in the right side of (5) is much smaller than the first term in the same side and thus may be disregarded practically. Then the relation (5) will be expressed as follows:

$$G_s = \frac{\pi}{4} d^2 \times m \times \rho \qquad (6)$$

Since the shaft S floats hydrodynamically at a given level in the fluid, $G_s$ is counterbalanced with $B_s$, thus:

$$d \times n \times h \times \gamma = \frac{\pi}{4} d^2 \times m \times \rho \qquad (7)$$

From (7):

$$h = \frac{\pi \times \rho \times m}{4 \times \gamma \times n} d \qquad (8)$$

It means that the shaft S floats hydrodynamically at a given level in the fluid as the fluid flows upward continuously through the bushing 10 with a head of $\pi.p.m.d/4 \cdot \gamma.n$.

Suppose, for instance, $m = 10d$, $n = 3d$, $\rho = 8$, $\gamma = 0.8$ and $d = 10$ cm, then $h$ will be given about 262 cm in terms of length from the above relation (8). This head $h$ is about 0.2 kg/cm³ in terms of pressure. It indicates that a shaft of substantial weight can be supported hydrodynamically with a fluid which flows upward continuously even with a relatively low head.

Practically the head required to float the shaft may be more or less varied subject to the viscosity of fluid, clearance between bush and shaft, vibration of shaft and other influential factors.

Since the shaft S floats hydrodynamically in the fluid which flows continuously all round the shaft S through the bushing 10, the shaft S never comes in contact with the bush 10 and therefore there occurs no friction of the shaft S against bushing 10, in other words, the friction of shaft S against bushing 10 is completely eliminated. Accordingly, both bushing 10 and shaft S are permanently free from the mutual abrasion due to friction. Moreover, the frictional loss of the drive required for rotating the shaft S is considerably reduced.

It will be understood that further modifications may be made in the construction of the above shown embodiment, and that the invention is in no way limited to the above embodiment.

What I claim is:

1. A bearing comprirsing a horizontal elongated cylindrical housing, an elongated cylindrical bushing with an inner wall inside said housing supporting a rotating shaft in an inserted relation, packing means provided at both sides of said bushing to seal said bushing and said shaft in a fluid-tight relationship, supply conduit means substantially normal to said housing pump means coupled to said supply conduit to drive a fluid from outside into said bushing and to supply a fluid into the lowermost central portion of said bushing with a given head, discharge conduit means to discharge a fluid out of both uppermost side portions of said bushing, the inner diameter of said bushing being substantially larger than the diameter of said shaft so that there is a substantial clearance between said bushing and said shaft to provide a continuous fluid passage all around said shaft within said bushing, whereby a fluid supplied into said bushing by way of said supply conduit means may flow from the lowermost central portion of said bushing to the uppermost side portions of said bushing through said fluid passage all around said shaft continuously upward with a given head and then be discharged out of said bushing by way of said discharge conduit means, thereby supporting said shaft with the upward flowing fluid in a hydrodynamically floating relation within said bushing.

2. A bearing in accordance with claim 1 wherein said bushing is provided with an annular groove in the central portion of said inner wall with also a pair of annular grooves in both side portions of said inner wall, the lowermost of said central annular groove being connected to said supply conduit means, the uppermost of said side annular grooves being connected to said discharge conduit means.

3. A bearing in accordance with claim 2, wherein said supply conduit means consist of a supply pipe, a radial aperture in the lowermost central portion of said housing and a radial aperture in the lowermost central portion of said bushing said central annular groove of the bushing being connected to said supply pipe by way of said radial apertures of the bushing and housing in an aligned relation.

4. A bearing in accordance with claim 3, wherein said discharge conduit means consist of a pair of discharge pipes, a pair of radial apertures in both uppermost side portions of said housing and a pair of radial apertures in both uppermost side portions of said bushing, said side annular grooves of the bushing being connected to said discharge pipes by way of said radial apertures of the bushing and housing in aligned relations, respectively.

* * * * *